United States Patent [19]

Goranson

[11] 4,166,954
[45] Sep. 4, 1979

[54] INSTRUMENT FOR DETERMINING INFRARED BEAM VERGENCE

[75] Inventor: Rex W. Goranson, Placitas, N. Mex.

[73] Assignee: II-VI Incorporated, Glenshaw, Pa.

[21] Appl. No.: 840,403

[22] Filed: Oct. 7, 1977

[51] Int. Cl.² .............................................. G01J 1/00
[52] U.S. Cl. ..................................... 250/338; 356/353
[58] Field of Search ....................... 250/338, 340, 349; 356/106 R, 107, 112

[56] References Cited

U.S. PATENT DOCUMENTS 3,829,219  8/1974  Wyant ............................. 356/107

Primary Examiner—Davis L. Willis

Attorney, Agent, or Firm—Webb, Burden, Robinson & Webb

[57] ABSTRACT

An instrument for determining the vergence of a beam in the infrared spectrum, particularly a laser beam, includes a wedged shear plate of suitable infrared transmissive material; a flat plate detector; parallel, spaced bars or strips of bolometric material, such as bismuth, applied to the plate in a pattern so as to match the "null" interferometric modulation from the wedged shear plate and alternately electrically connected to provide a pair of parallel electrical circuits providing signals for comparison; means for rotating and tilting the detector to provide "null" readout from the compared signals and means for directly measuring the vergence of the beam by a measure of the amount of rotation and tilt required to achieve a "null" readout.

14 Claims, 4 Drawing Figures

INSTRUMENT FOR DETERMINING INFRARED BEAM VERGENCE

FIELD OF THE INVENTION

This invention relates to scientific laboratory detection apparatus and particularly to an instrument for detecting the vergence of a light beam, especially a laser beam, in the infrared spectrum.

BACKGROUND OF THE INVENTION

In order to perform critical scientific measurements which depend for accuracy upon the quality and character of light beams, it is essential to accurately determine the vergence of the beam. Instruments having special detectors have been used. Heretofore, this has been done in the visible spectrum with instruments such as Continental Optical Company's collimation tester which includes a wedged shear plate and a screen on which light patterns can be optically displayed and measured, but such instruments are not adapted to the infrared range. Moreover, although some prior instruments, such as energy detectors, have used detectors on which bismuth spots have been applied, none of these instruments has applied bismuth in the manner described herein.

THEORY OF THE INVENTION

It is common knowledge that a slightly wedged flat glass plate will produce straight and parallel interference fringes when illuminated with a collimated, suitably coherent monochromatic beam of light. The fringes arise in interference between the beams reflected from the front and back surfaces of the plate, and their spacing is determined mainly by the wedge angle of the plate.

Also well known are the fringes produced by illuminating an accurately plane-parallel plate with a beam having some divergence or convergence. These fringes are due to the shearing effect of the plate and the curvature of the beam wave front determines the fringe spacing.

In the classic case of a plane-parallel plate of thickness t and refractive index n, a beam incident at some angle, I, will be sheared by an amount S given by $$S = \frac{2t \sin I \cos I}{\sqrt{n^2 - \sin^2 I}}$$

If the wavefront of the beam is flat, there will be no interference fringes produced and the overall light-or-darkness of the region of overlap in the reflected beams will depend on the relative phases of the two beams. If, however, there is some net sphericity in the wavefront, fringes similar to those of Young's experiment will result. There are then two virtual point sources separated by the distance S and at an apparent distance L from the plate. Fringes of period $P_\theta$ are provided, where $$P_\theta = \frac{\lambda L}{S} \quad (1)$$

Since a vergence angle $\theta$ may be defined in terms of the beam diameter, D, divided by the apparent distance L, $$P_\theta = \frac{\lambda D}{\theta S} \quad (2)$$

Thus, a perfectly collimated beam produces infinitely broad fringes. The magnitude (but not the sign) of $\theta$ may be found by measuring $P_\theta$.

In examining the fringes produced by a plate of wedge angle $\beta$, the relative orientation of the wedge and the plane of incidence must be considered. If $\beta$ and I are coplanar, the collimated-light fringes (period $P_\beta$) will be parallel to the fringes due to vergence and no fringe-tilting can result. The plate must be used with the wedge perpendicular to the plane of incidence. Then $$P_\beta = \frac{\lambda}{2n\beta} \quad \text{Where } \beta << I. \quad (3)$$

Hence, there are two fringe-producing mechanisms acting simultaneously: (1) vertical fringes from shearing of a spherical wavefront, and (2) horizontal fringes from the plate wedge acting on a collimated beam. Mathematically, the resultant fringe system is the vector sum, in 1/p space, of the two components:

$$\frac{1}{P_x^2} = \frac{1}{P_\theta^2} \times \frac{1}{P_\beta^2}$$

thus $$P_\beta = P_\theta \tan \gamma \quad (4)$$

and $$P_x = P_\beta \cos \gamma$$

where $P_x$ is the observed fringe spacing and $\gamma$ is the angle of inclination of the fringes from the horizontal. As required, the zero-$\theta$ fringes are those due to wedge alone. As positive or negative vergence is introduced, the fringes rotate through an angle $\gamma$ and also become more closely spaced.

By combining equations 1, 2, 3 and 4, it is determined that $$\theta = \beta \frac{D}{t} \cdot \frac{n\sqrt{n^2 - \sin^2 I}}{\sin I \cos I} \tan \alpha$$

Since the values of $\beta$, D, t, n and I are all known, one may design an experiment such that $\theta$ can be determined by measuring $\gamma$. The vergence $\theta$ may be expressed as an angle in either degrees, grads or radians, or the inverse apparent radius of curvature which is equivalent to $\theta/D$, equals 1/L, usually expressed in diopters (inverse meters), or as the apparent radius of curvature which is equivalent to $D/\theta$, equals L, expressed as a linear dimension in meters.

As in Young's experiment, the $P_\theta$ fringes only appear straight over a limited region. The complete fringe pattern, if it could be observed, would be a family of hyperbolas with loci at the two virtual sources. However, as a practical matter, the useful fringes are sufficiently straight for measurement of vergence.

From the foregoing it is evident that the fringe pattern from a wedge, and specifically a zinc selenide (ZnSe) wedge, properly designed and oriented, will rotate proportionately to the vergence of infrared radiation. By appropriate detection and measurement of this rotation, vergence of the beam can be determined.

SUMMARY OF THE INVENTION

The present invention provides an instrument for measuring the vergence of a beam in the infrared spectrum. The instrument includes a novel detector comprising a substantially flat plate of metal or metal oxide, preferably composed of, or overcoated with alumina, anodized aluminum, or beryllia highly polished on one surface, upon which are evaporated thin film strips or bars of bolometric material, such as metals or semimetals, the most responsive of which is bismuth. The bars are alternately connected in parallel electrically for differential signal comparison. Means may be provided for cooling the detector.

The instrument also includes means for aligning the detector with the beam whose vergence is to be determined, i.e., by translating, rotating and tilting the detector, to maximize sensitivity of the instrument and to provide means for direct readout of the value of the vergence.

The instrument according to the invention provides a compact, dependable, accurate instrument for measuring the vergence of a beam in the infrared spectrum. As an example, resolution and accuracy of the instrument approaches one microradian for an aperture of ten centimeters. The instrument is especially useful for laboratory calibration of laser apparatus; it is also applicable to industrial, communications and weapons fields.

The present specification describes an instrument presently preferred for determining the vergence of infrared beams. The instrument is applicable to relatively large infrared optics; the size of laser beams often encountered in laser laboratory situations.

DETAILED DESCRIPTION OF PREFERRED EMBODIMENTS OF THE INVENTION

Figure 1:
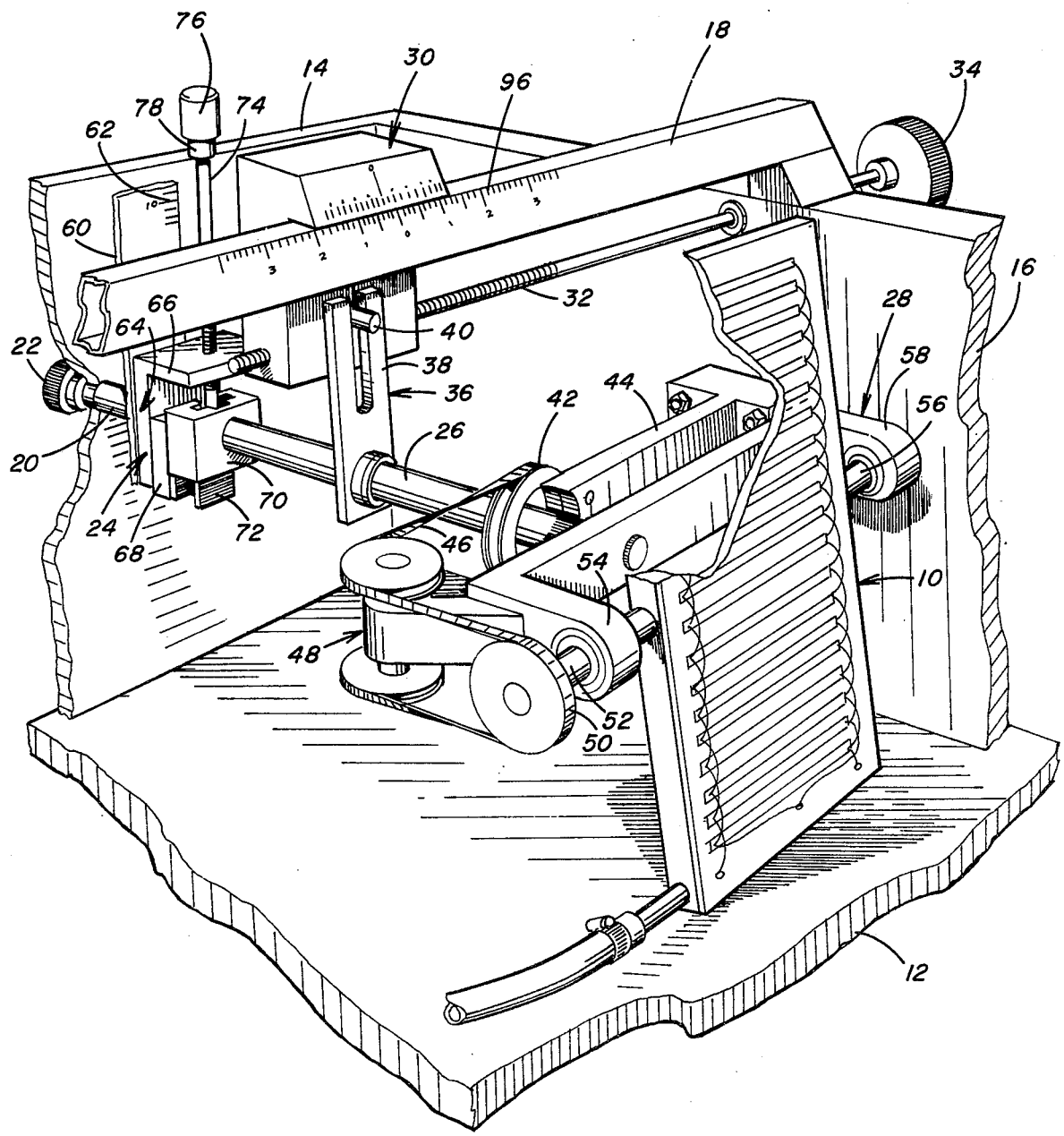
FIG. 1 is a schematic perspective view of an instrument in accordance with the invention.

An instrument for determining the vergence of a beam in the infrared range comprises a detector 10 adapted for rotation, translation and tilt. As shown in FIG. 1, the means for rotating, translating and tilting detector 10 comprises a base 12, vertical support 14 and, perpendicular thereto, vertical support 16. A beam 18 extends outwardly from vertical support 14 and parallel to support 16.

One end of a short shaft 20 is journaled in a bearing 22 in support 16 and extends perpendicular to the beam 18. An adjustable device 24 described hereinafter is mounted on the opposite end of the shaft 20 and a shaft 26 is cantilevered from the device 24. A clevis structure 28 is provided at the opposite end of shaft 26 for pivotally supporting the detector 10. A vernier slide 30 is slideably mounted on beam 18 and is movable along the beam by a threaded rod 32 secured to a control knob 34. A U-shaped plate 36 affixed at one end to shaft 26 includes legs 38 which engage opposite sides of a pin 40 extending from the vernier slide 30.

A sheave or pulley 42 is mounted on a T-shaped bracket 44 secured to support 16. Shaft 26 extends freely through the pulley. A belt 46 passes around spool idler 48 and around pulley 50 on an end of pin 52 which extends through arm 54 of the clevis structure 28 and is secured in an opening on one side of detector 10. The opposite side of the detector is supported by a pin 56 which is mounted on the other arm 58 of the clevis structure. Accordingly, when the shaft 26 is rotated by adjusting control knob 34 the clevis structure is also rotated in a plane perpendicular to the axis of shaft 34. Since the detector 10 is carried by the clevis structure, it is also rotated. And, since pulley 42 is fixed relative to the shaft 34, as the shaft rotates, pulley 50 and pin 52 are also rotated by belt 46 causing the detector 10 to tilt with respect to the plane of rotation of the clevis structure 28. In other words, adjustment of the control knob 34 causes the detector to rotate and to tilt simultaneously.

The device 24 provides means for fine translation adjustment of the position of the detector. The device 24 comprises a vertical plate 60, one end of which is joined to shaft 20 and the opposite end has a scale 62. An L-shaped bracket 64 having a leg 66 extending outwardly in the direction of shaft 26 is located adjacent plate 60 on the end of shaft 20. The end of the shaft 20 is secured in a block 68. As previously described, the end of shaft 26 is secured in the device 24 and specifically in a block 70 which is positioned on a guide 72 depending from the leg 66 of the bracket 64. The block 70, and thus, the shaft 26 cantilevered thereby, are vertically adjustable on the guide 72 by means of a rod 74 secured to the block and containing threads which are engageable with a threaded opening in the leg 66. The rod 74 may be rotated by means of a handle 76 on the end of rod 74 above a horizontally extending mark 78 aligned with scale 62.

Figure 2:
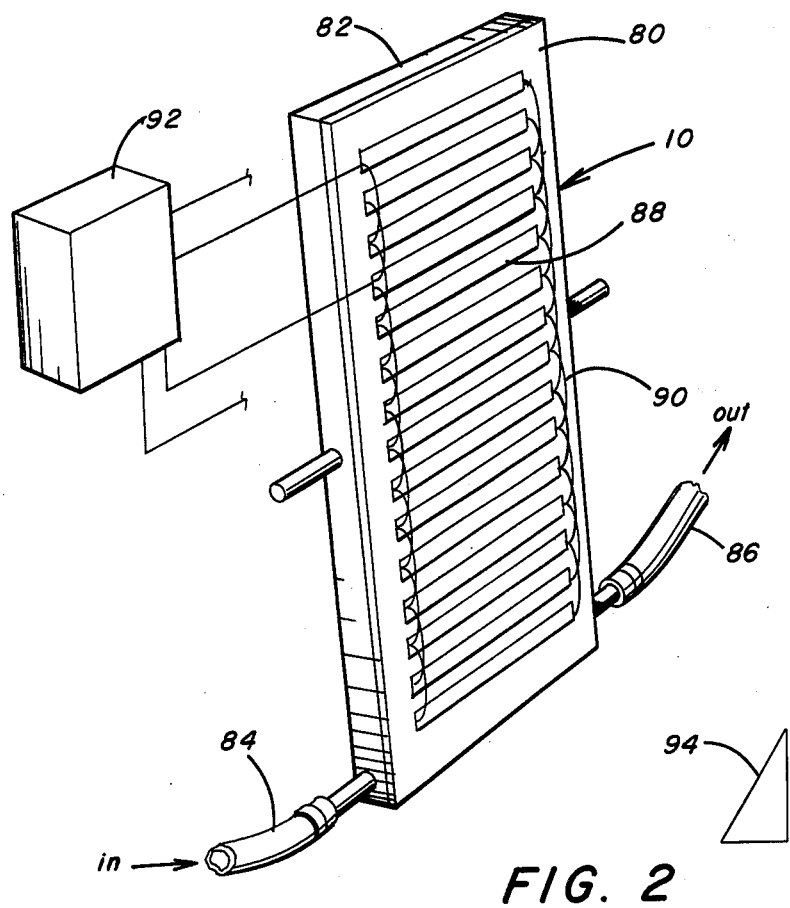
FIG. 2 is an enlarged perspective view of one form of detector useful in the instrument.

The detector 10, as shown in FIG. 2, comprises a substantially flat plate 80 of electrical insulator such as a metal oxide, that is also a thermal conductor, for example alumina, beryllia, anodized aluminum or equivalent, on a substrate 82 of a good thermally conductive material, for example copper or aluminum, in close thermal contact. The plate may be vapor deposited on, electrochemically formed on, cemented to, or otherwise fastened to the substrate. Means, such as coils embedded in the substrate having an inlet 84 and an outlet 86, may be provided for flushing cooling water through the substrate continuously to sink the temperature applied by an infrared beam impinging upon the detector. One preferred form of detector has a plane surface approximately 15×20 centimeters.

There are a plurality of horizontal strips or bars 88 of bolometric detector material such as thin film metal or semimetal, such as bismuth, equally spaced in parallel on the plane front surface of the detector. The bismuth material is the most responsive of the bolometric materials, and is preferably vacuum deposited on the electrically insulated substrate plate; however, other known methods of deposition are equally suitable. Alternate bars 88 are electrically connected to one another by wires 90. Each set of bars which are electrically connected are also connected to a readout 92. The spacing of the bars is related to twice the frequency of the null vergence fringe characteristics of the particular wedged shear plate 94 to be used and, for the particular wavelength of the beams to be tested.

In order to determine the vergence of a particular laser beam, an appropriate beam splitter, preferably a wedge 94 of ZnSe is selected. The beam is passed through the wedge and is divided into two components, a transmitted beam and a reflected beam. Either the reflected or the transmitted beam is directed to the detector where it will impinge upon the bismuth bars 88. Since the object is to obtain maximum sensitivity of the beam, the translation, tilt and rotation of the detector is adjusted to obtain a null reading on the readout 92 at which value maximum sensitivity is obtained.

The bar-space frequency is designed to be twice the null fringe pattern frequency (the pattern that results from the wedge in a 45° incident collimated beam). This provides a basis for a normalized differential signal indicative of the rotational match of the detector to the fringe pattern rotation as a result of non-collimated inputs. Since alternate bars of the detector are connected in parallel, all odd bars are compared differentially to all even bars. This difference signal will be a maximum (plus or minus) when the detector is translated so that odd bars coincide with fringe peaks and even bars with valleys, or the reverse. The reading is normalized by summing the odd and even bar signals and dividing the sum into the difference. A practical circuit for determining $1-[|A-B|/(A+B)]$ is described hereinafter. The degree to which a true zero readout cannot be achieved is a measure of residual divergence.

To compensate for an increase in fringe spacing (or frequency) with rotation, the spacing of detector bars 88 is effectively increased in frequency to match, by tilting the detector 10. The tilt angle required is equal to the rotation angle. This tilt is then mechanized by pivoting the detector on the axis across the face parallel to the bar pattern, and gearing this in a 1:1 ratio with the other rotational axis normal to the face (at null).

Since the vergence $\theta = C \tan \gamma$, the tangent of the detector rotation is ascertained mechanically by using a linear motion pointer or vernier slide 30 cammed by a radial arm or U-shaped bracket 36 from the rotating shaft 26. This results in a linear scale for vergence, allowing the use of a vernier scale 96 on the beam 18, providing an additional order of magnitude resolution. Hence, the vergence can be read directly on the linear vernier scale. It will be apparent to those skilled in the art that appropriate, conventional readout means, such as a suitable potentiometer, may be provided for remote readout of the vergence.

Figure 3:
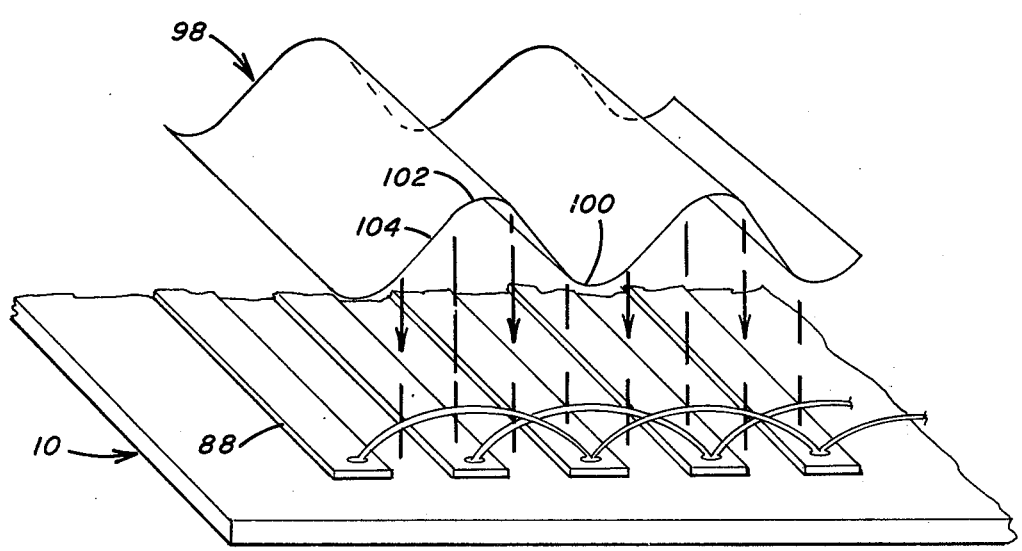
FIG. 3 is a schematic view of a laser beam fringe pattern to detector relationship at "null" input.

FIG. 3 shows the theoretical impingement of an instantaneous fringe modulation or waveform 98 on a detector 10. The peaks 100 and valleys 102 of the waveform represent points of maximum and minimum relative intensity, whereas the areas 104 between the peaks and valleys comprise points of approximately equal intensity. By rotating and tilting the detector, therefore, the bars 88 of the detector can be as aligned with the waveforms such that the points of highest and lowest intensity coincide with the odd and even bars, or the reverse, to obtain maximum sensitivity.

The fringe signal can be approximated by a square waveform which is about 92% of the sinusoidal peak to peak. The differential signal is proportional to the area of the widths of two bars 88 or the fringe spacing therebetween which is equivalent. Near alignment of the detector to the fringes (when differential signal is available) the overlap area, $A = PD - \alpha D^2 = D(P - \alpha D)$, where $\alpha$ is the relative detector bar to fringe pattern tilt.

The maximum signal is equal to kPD, where k is the system responsivity and the error signal $= dA/d\alpha$ is proportional to $D^2$. Consequently, the error signal is linear, is a strong function of the effective aperture (usually the beam diameter), and has an inherent gain of D/P.

In a typical example, a fringe spacing of about one centimeter results from a zinc selenide wedge of about 30 arc seconds at 45° to a $CO_2$ laser beam. With a 10 cm diameter beam and a nominally 5 mm thick plate, a range of ±10 milliradians half angle of vergence measurement with a detector rotation of ±32° is provided. The ultimate resolution is about ±1 microradian, and $D/P = 10 = 0.1$ radian. Using this wedge, an $\alpha$ of 1° equals 559 $\mu$radians of vergence and there is an angular magnification of 31.25, so that a rotation of 0.1 radian indicates 3.2 milliradians of vergence. If full scale is ±2 volts (2 millirad = 2 volts, 0 rad. = 0 volts), then the residual divergence may be read from a 3½ digit digital voltmeter in microradians, i.e., a minimum reading of 14 would indicate 14 microradians residual divergence.

In actual practice, the fringes are not rectangular "boxes" or waveforms of integrated energy, but are sinusoids modulated by the Gaussian beam or other shape, so the likely practical resolution is closer to ±10 $\mu$radians rather than the theoretical ±1 $\mu$radian obtained above (where 10.6 $\mu$radians corresponds to better than $\mu/20$ at 10.6 $\mu$meter wavelength).

As previously noted, the vergence angle may be similarly remotely read digitally by providing a linear or multi-turn potentiometer readout 92 of 0.05% or 0.1% linearity, connected between the vernier slide 30 and the beam 18, where 2 v = 20 milliradians, a 3½ digit meter providing 10 $\mu$radian resolution.

It is possible to provide remote control of rotation and translation of the detector, independently, using selsyn servo techniques. Moreover, open ended systems may be used since the digital displays provide the necessary feedback.

Figure 4:
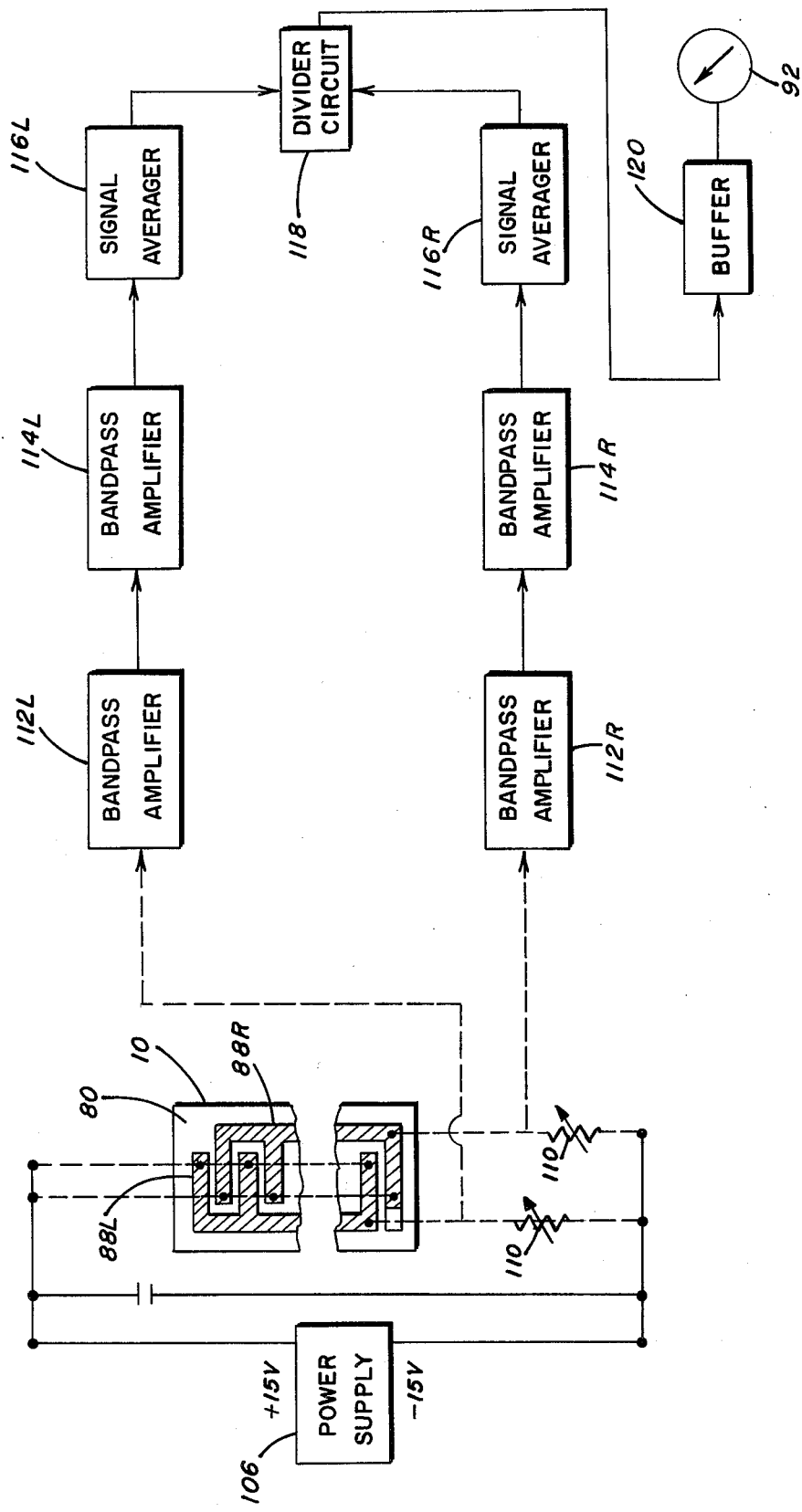
FIG. 4 is a schematic block diagram of the circuit of an instrument according to the invention.

Referring to FIG. 4, detector 10 comprises a metal oxide plate 80 having left and right detector bars 88L and 88R, respectively. The bars are formed of bismuth, vacuum deposited on the plate. A voltage is applied across each of the sets of bars 88L and 88R from a power supply 106, preferably 15 v. D.C. Variable resistors 110, one in each of the circuits across bars 88L and 88R, are properly adjusted so that the voltage across the bars 88L equals the voltage across bars 88R and the net voltage is approximately equal to 0 volts or "null" readout.

Signals from each of the detector bars 88L and 88R, respectively, are passed in series through bandpass amplifiers 112L and 112R, bandpass amplifiers 114L and 114R, and signal averagers 116L and 116R. The resultant signals from each set of bars is then passed to a divider circuit 118 which compares the two signals and feeds a signal through buffer 120 to readout 92 which may be either an analog or digital meter.

Having described presently preferred embodiments of the invention, it may be otherwise embodied within the scope of the appended claims.

I claim:

1. An instrument for determining the vergence of an infrared beam comprising:
 A. a wedged shear plate:
 B. a detector for receiving the interferometric modulation of the beam;

C. means for simultaneously rotating and tilting the detector to locate the interferometric fringes;
D. means to translate the detector to maximize the sensitivity of the detector to the beam;
E. means for reading the vergence of the beam; and
F. means for reading effectiveness of detector translation, rotation and tilt to match the interferometric fringe pattern.

2. An instrument as set forth in claim 1 wherein the detector comprises:
A. a plate of thermally conductive, electrically insulating material;
B. a plurality of light sensitive, spaced parallel bars applied to a surface of said plate;
C. means for electrically connecting alternate bars to one another such that the bars are in parallel electrical connection to provide a pair of electrical signals; and
D. means for comparing the pair of electrical signals to determine a value which is related to the match between the detector bars and the interferometric modulation of the beam.

3. An instrument as set forth in claim 2 in which the detector plate material is selected from the group consisting of alumina, anodized aluminum and beryllia.

4. An instrument as set forth in claim 3 in which the bars are formed of bismuth material.

5. An instrument as set forth in claim 4 wherein the bars of bismuth material are applied to the plate by vacuum deposition.

6. An instrument as set forth in claim 2 in which the plate is secured to a metal substrate and means are provided in the substrate for cooling the substrate.

7. An instrument as set forth in claim 6 in which the cooling means comprises a coil through which water is to be circulated.

8. An instrument as set forth in claim 1 in which the readout means comprises a differential meter.

9. An instrument as set forth in claim 1 in which the wedged shear plate is formed of zinc selenide.

10. An instrument for determining the vergence of an infrared beam comprising:

A. a wedged shear plate;
B. a detector for receiving the beam including a plate of electrically insulating surfaced material, a plurality of light-sensitive, spaced, parallel bars of bolometric material applied to a surface of said plate in such a way as to match the interferometric modulation of the wedged shear plate, means for electrically connecting alternate bars to one another such that the bars are in parallel electrical connection to provide a pair of electrical signals, and means for comparing the signals;
C. means for rotating and tilting the detector to such an extent that the beam is aligned with the bars to minimize the difference between the compared electrical signals whereby the motion required for said minimization is a measure of the beam vergence; and
D. means to translate the detector whereby the sensitivity of the detector to the beam is maximized.

11. An instrument as set forth in claim 10 wherein the plate material is selected from the group consisting of alumina, anodized aluminum and beryllia.

12. An instrument as set forth in claim 10 in which the plate is secured to or formed from a conductive metal substrate including means for cooling the substrate.

13. An instrument as set forth in claim 10 in which the means for rotating and tilting the detector comprises a clevis structure having a pair of parallel arms between which the detector is suspended, the plane of the plate being perpendicular to the plane of each arm, means for rotating the clevis structure in a plane perpendicular to the plane through the arms, means connected to the clevis structure rotating means for tilting the detector responsive to the extent of rotation of the clevis structure such that as the detector is rotated it is also tilted to substantially align the infrared interferometric pattern of the wedged-shear plate to the bars on the plate.

14. An instrument as set forth in claim 10 in which the wedged shear plate is aligned at a fixed angle to the null position detector normal, with the wedge angle perpendicular to the plane of incidence of the beam.

* * * * *